(12) United States Patent  
Wyszynski et al.

(10) Patent No.: US 7,401,418 B2
(45) Date of Patent: Jul. 22, 2008

(54) ARTICLE OF FOOTWEAR HAVING MIDSOLE WITH SUPPORT PILLARS AND METHOD OF MANUFACTURING SAME

(75) Inventors: Randall Wyszynski, Lake Oswego, OR (US); Michael A. Calvano, Tualatin, OR (US); Gerald Edwin Crowley, Beaverton, OR (US); Paul Caron, Hillsboro, OR (US); Michael Hui, Lake Oswego, OR (US)

(73) Assignee: NIKE, Inc., Beaverton, OR (US)

( * ) Notice: Subject to any disclaimer, the term of this patent is extended or adjusted under 35 U.S.C. 154(b) by 377 days.

(21) Appl. No.: 11/206,254

(22) Filed: Aug. 17, 2005

(65) Prior Publication Data

US 2007/0039204 A1 Feb. 22, 2007

(51) Int. Cl.
*A43B 13/20* (2006.01)
(52) U.S. Cl. .......................................... 36/28; 36/35 R
(58) Field of Classification Search .................... 36/28, 36/29, 35 B, 35 R
See application file for complete search history.

(56) References Cited

U.S. PATENT DOCUMENTS

| | | | |
|---|---|---|---|
| 507,490 A | 10/1893 | Gambino |
| 607,086 A | 7/1898 | Safford |
| 622,673 A | 4/1899 | Ferrata |
| 933,422 A | 9/1909 | Dee |
| 949,754 A | 2/1910 | Busky |
| 1,094,211 A | 4/1914 | Jenoi et al. |
| 1,099,180 A | 6/1914 | Karacsonyi |
| 1,102,343 A | 7/1914 | Kovacs |
| 1,272,490 A | 7/1918 | Matear |
| 1,278,320 A | 9/1918 | Ellithorpe |
| 1,338,817 A | 5/1920 | DeLuca |
| 1,502,087 A | 7/1924 | Bunns |
| 1,670,747 A | 5/1928 | Sestito |
| 1,870,065 A | 8/1932 | Nusser |
| 1,870,114 A | 8/1932 | Heller |
| 2,104,924 A | 1/1938 | Dellea |
| 2,122,108 A | 6/1938 | Modlin |
| 2,198,228 A | 4/1940 | Pinaud et al. |
| 2,299,009 A | 10/1942 | Denk |
| 2,437,227 A | 3/1948 | Hall |
| 2,710,460 A | 6/1955 | Stasinos |
| 2,721,400 A | 10/1955 | Israel |
| 3,041,746 A | 7/1962 | Rakus |
| 3,429,545 A | 2/1969 | Michel |

(Continued)

FOREIGN PATENT DOCUMENTS

CH 570130 12/1975

(Continued)

OTHER PUBLICATIONS

International Search Report from PCT/US2006/032111.

(Continued)

*Primary Examiner*—Ted Kavanaugh
(74) *Attorney, Agent, or Firm*—Banner & Witcoff, Ltd.

(57) ABSTRACT

An article of footwear includes an upper, a sole assembly, and a support assembly positioned in the sole assembly and including a plurality of pillars. Each pillar includes an outer layer and an inner layer of cushioning material contained with the outer layer.

25 Claims, 6 Drawing Sheets

U.S. PATENT DOCUMENTS

| | | | |
|---|---|---|---|
| 3,822,490 A | 7/1974 | Murawski | |
| 4,000,566 A | 1/1977 | Famolare, Jr. | |
| 4,030,213 A | 6/1977 | Daswick | |
| 4,074,446 A | 2/1978 | Eisenberg | |
| 4,223,457 A | 9/1980 | Borgeas | |
| 4,237,625 A | 12/1980 | Cole et al. | |
| 4,241,523 A | 12/1980 | Daswick | |
| 4,262,433 A | 4/1981 | Hagg et al. | |
| 4,267,648 A | 5/1981 | Weisz | |
| 4,271,606 A | 6/1981 | Rudy | |
| 4,314,413 A | 2/1982 | Dassler | |
| 4,319,412 A | 3/1982 | Muller et al. | |
| 4,342,158 A | 8/1982 | McMahon et al. | |
| 4,364,188 A | 12/1982 | Turner | |
| 4,399,621 A | 8/1983 | Dassler | |
| 4,439,936 A | 4/1984 | Clarke et al. | |
| 4,492,046 A | 1/1985 | Kosova | |
| 4,494,321 A | 1/1985 | Lawlor | |
| 4,535,553 A * | 8/1985 | Derderian et al. | 36/28 |
| 4,536,974 A | 8/1985 | Cohen | |
| 4,546,555 A | 10/1985 | Spademan | |
| 4,559,366 A | 12/1985 | Hostettler | |
| 4,566,206 A | 1/1986 | Weber | |
| 4,592,153 A | 6/1986 | Jacinto | |
| 4,594,799 A | 6/1986 | Lin | |
| 4,598,484 A | 7/1986 | Ma | |
| 4,598,487 A | 7/1986 | Misevich | |
| 4,610,099 A | 9/1986 | Signori | |
| 4,616,431 A | 10/1986 | Dassler | |
| 4,624,062 A | 11/1986 | Autry | |
| 4,638,575 A | 1/1987 | Illustrato | |
| 4,638,577 A | 1/1987 | Riggs | |
| 4,660,299 A | 4/1987 | Omilusik | |
| 4,680,875 A | 7/1987 | Danieli | |
| 4,680,876 A | 7/1987 | Peng | |
| 4,709,489 A | 12/1987 | Welter | |
| 4,715,130 A | 12/1987 | Scatena | |
| 4,722,131 A | 2/1988 | Huang | |
| 4,731,939 A | 3/1988 | Parracho et al. | |
| 4,733,483 A | 3/1988 | Lin | |
| 4,746,555 A | 5/1988 | Luckanuck | |
| 4,753,021 A | 6/1988 | Cohen | |
| 4,774,774 A | 10/1988 | Allen, Jr. | |
| D298,583 S | 11/1988 | Yung-Mao | |
| 4,794,707 A | 1/1989 | Franklin et al. | |
| 4,798,009 A | 1/1989 | Colonel et al. | |
| 4,802,289 A | 2/1989 | Guldager | |
| 4,815,221 A | 3/1989 | Diaz | |
| 4,843,737 A | 7/1989 | Vorderer | |
| 4,843,741 A | 7/1989 | Yung-Mao | |
| 4,878,300 A | 11/1989 | Bogaty | |
| 4,881,328 A | 11/1989 | Yung-Mao | |
| 4,881,329 A | 11/1989 | Crowley | |
| 4,887,367 A | 12/1989 | Mackness et al. | |
| 4,905,382 A | 3/1990 | Yung-Mao | |
| 4,908,962 A | 3/1990 | Yung-Mao | |
| 4,910,884 A | 3/1990 | Lindh et al. | |
| 4,918,838 A | 4/1990 | Chang | |
| 4,936,029 A | 6/1990 | Rudy | |
| 4,956,927 A | 9/1990 | Misevich et al. | |
| 4,984,376 A | 1/1991 | Walter et al. | |
| D315,634 S | 3/1991 | Yung-Mao | |
| 5,005,300 A | 4/1991 | Diaz et al. | |
| 5,014,449 A | 5/1991 | Richard et al. | |
| 5,068,981 A | 12/1991 | Jung | |
| 5,092,060 A | 3/1992 | Frachey et al. | |
| 5,138,776 A | 8/1992 | Levin | |
| 5,222,312 A | 6/1993 | Doyle | |
| 5,233,767 A | 8/1993 | Kramer | |
| 5,343,639 A | 9/1994 | Kilgore et al. | |
| 5,353,523 A | 10/1994 | Kilgore et al. | |
| 5,572,804 A | 11/1996 | Skaja et al. | |
| 5,685,090 A | 11/1997 | Tawney et al. | |
| 5,782,014 A * | 7/1998 | Peterson | 36/28 |
| 5,853,844 A | 12/1998 | Wen | |
| 5,976,451 A | 11/1999 | Skaja et al. | |
| 6,018,889 A | 2/2000 | Friton | |
| 6,029,962 A | 2/2000 | Shorten et al. | |
| 6,055,747 A | 5/2000 | Lombardino | |
| 6,098,313 A | 8/2000 | Skaja | |
| 6,115,944 A | 9/2000 | Lain | |
| 6,131,310 A | 10/2000 | Fang | |
| D433,216 S | 11/2000 | Avar et al. | |
| 6,205,681 B1 | 3/2001 | Kita | |
| 6,219,939 B1 | 4/2001 | Kita et al. | |
| 6,219,940 B1 | 4/2001 | Kita | |
| 6,233,846 B1 | 5/2001 | Sordi | |
| 6,289,608 B1 | 9/2001 | Kita et al. | |
| 6,295,741 B1 | 10/2001 | Kita | |
| 6,305,100 B1 | 10/2001 | Komarnycky et al. | |
| 6,311,414 B1 | 11/2001 | Kita | |
| 6,314,664 B1 | 11/2001 | Kita et al. | |
| 6,389,713 B1 | 5/2002 | Kita | |
| 6,393,732 B1 | 5/2002 | Kita | |
| 6,401,365 B2 | 6/2002 | Kita et al. | |
| 6,457,261 B1 | 10/2002 | Crary | |
| 6,557,270 B2 | 5/2003 | Nakano et al. | |
| 6,568,102 B1 | 5/2003 | Healy et al. | |
| 6,625,905 B2 | 9/2003 | Kita | |
| 6,647,645 B2 | 11/2003 | Kita | |
| 6,777,062 B2 | 8/2004 | Skaja | |
| 2004/0128860 A1 | 7/2004 | Smaldone et al. | |
| 2004/0154189 A1 | 8/2004 | Wang | |

FOREIGN PATENT DOCUMENTS

| | | |
|---|---|---|
| DE | 806647 | 5/1952 |
| DE | 1485654 | 3/1970 |
| DE | 3400997 | 7/1985 |
| EP | 1 447 020 A1 | 8/2004 |
| ES | 2080933 | 2/1996 |
| ES | 1036287 | 7/1997 |
| FR | 465267 | 4/1914 |
| FR | 1227420 | 8/1960 |
| FR | 2556188 A | 6/1985 |
| GB | 21594 | 8/1903 |
| GB | 7163 | 3/1907 |
| GB | 2032761 A | 5/1980 |
| GB | 2173987 A | 10/1986 |
| JP | 146188 | 11/1990 |
| SU | 1526637 A1 | 7/1989 |

OTHER PUBLICATIONS

Article entitled "Hoop Dreams" (Applicant does not know the date of publication; however, it is believed that the publication date for this reference is at least one year prior to May 18, 2006 filing date for the present application), 1 Page.

Advertisement for Aura "Introducing the exciting new performance driven 2001 Aura", 1 Page.

Web page translation using babelfish, entitled "The tennis shoe with the Motivating Force" (Applicant does not know the date of publication; however, it is believed that the publication date for this reference is at least one year prior to May 18, 2006 filing date for the present application), 2 Pages.

FWN, vol. 46, No. 38, Sep. 17, 1990, "Marco Scatena puts sprint in Athlon wearers' control," 1 Page.

Spring-and Shock Absorber Bearing Spring Elements Springing Comfort with High Damping (Applicant does not know the date of publication; however, it is believed that the publication date for this reference is at least one year prior to May 18, 2006 filing date for the present application), 3 Pages.

Activ Power Spring System catalog, front and back pages with English translation of back page, 3 Pages.

US 4,974,345, 12/1990, Yung-Mao (withdrawn)

* cited by examiner

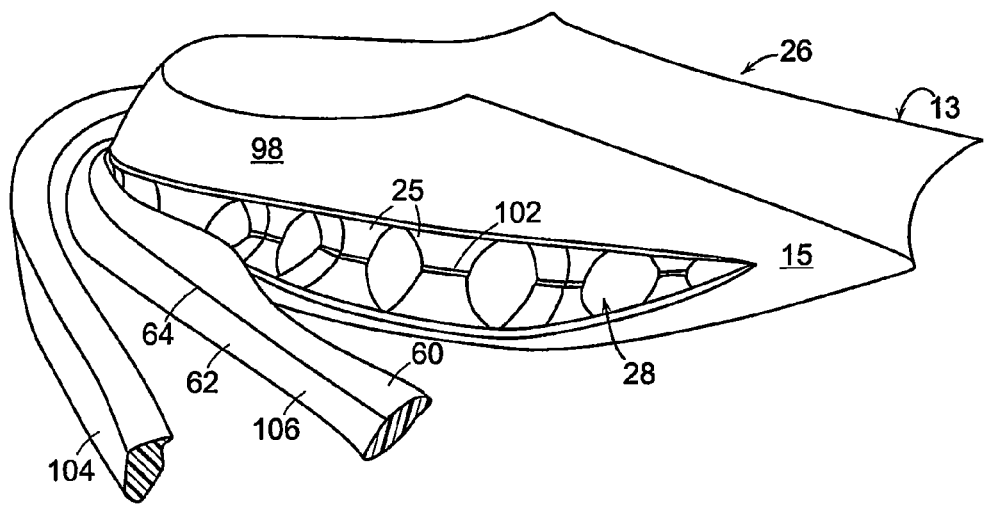
FIG. 6
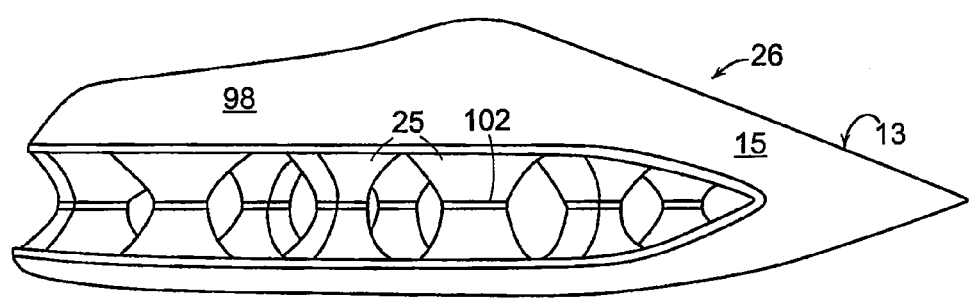
FIG. 7
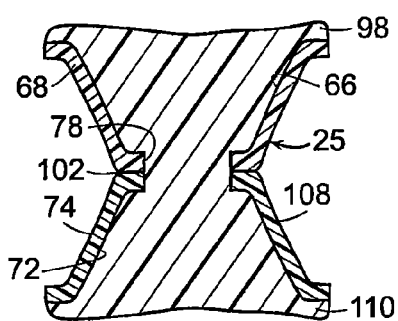 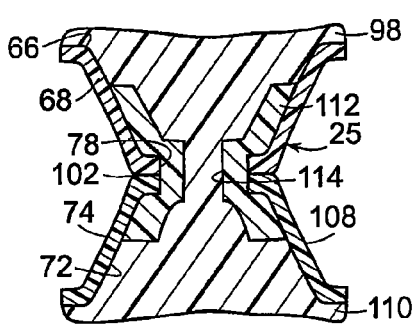
FIG. 8  FIG. 9

US 7,401,418 B2

ARTICLE OF FOOTWEAR HAVING MIDSOLE WITH SUPPORT PILLARS AND METHOD OF MANUFACTURING SAME

FIELD OF THE INVENTION

This invention relates generally to an article of footwear, and, in particular, to an article of footwear having a midsole with support pillars positioned therein and a method of manufacturing the same.

BACKGROUND OF THE INVENTION

A conventional article of athletic footwear includes two primary elements, an upper and a sole structure. The upper provides a covering for the foot that securely receives and positions the foot with respect to the sole structure. In addition, the upper may have a configuration that protects the foot and provides ventilation, thereby cooling the foot and removing perspiration. The sole structure is secured to a lower portion of the upper and is generally positioned between the foot and the ground. In addition to attenuating ground reaction forces (i.e., imparting cushioning), the sole structure may provide traction and control foot motions, such as pronation. Accordingly, the upper and the sole structure operate cooperatively to provide a comfortable structure that is suited for a variety of ambulatory activities, such as walking and running.

The sole structure of athletic footwear generally exhibits a layered configuration that includes a comfort-enhancing insole, a resilient midsole formed from a polymer foam material, and a ground-contacting outsole that provides both abrasion-resistance and traction. The midsole is the primary sole structure element that imparts cushioning and controls foot motions. Suitable polymer foam materials for the midsole include ethylvinylacetate or polyurethane that compress resiliently under an applied load to attenuate ground reaction forces. Conventional polymer foam materials are resiliently compressible, in part, due to the inclusion of a plurality of open or closed cells that define an inner volume substantially displaced by gas. The polymer foam materials of the midsole may also absorb energy when compressed during ambulatory activities.

It would be desirable to provide an article of footwear that reduces or overcomes some or all of the difficulties inherent in prior known devices. Particular objects and advantages will be apparent to those skilled in the art, that is, those who are knowledgeable or experienced in this field of technology, in view of the following disclosure of the invention and detailed description of certain embodiments.

SUMMARY

The principles of the invention may be used to advantage to provide an article of footwear with support pillars. In accordance with a first aspect, an article of footwear includes an upper, a sole assembly, and a support assembly positioned in the sole assembly and including a plurality of pillars. Each pillar includes an outer layer and an inner layer of cushioning material contained with the outer layer.

In accordance with another aspect, an article of footwear includes an upper, a sole assembly, and a support assembly positioned in a heel portion of the sole assembly and including a plurality of pillars. Each pillar includes an outer layer having an upper portion including a first recess formed of walls and a bottom. A lower portion has a second recess formed of walls and a top, with the bottom of the first recess and the top of the second recess being in abutting relationship. An aperture extends through the bottom of the first recess and the top of the second recess. An inner layer of cushioning material is contained with the outer layer and extends through the aperture.

In accordance with a further aspect, a method of manufacturing an article of footwear includes the steps of forming a fluid-filled bag having a plurality of apertures extending there through with a first mold; inserting the fluid-filled bag into a second mold; pouring a cushioning material into the second mold to form a support assembly with cushioning material covering the bag and extending through the apertures of the fluid-filled bag to form pillars; removing the support assembly from the second mold; cutting away a portion of the cushioning material about a periphery of the support assembly; cutting away a portion of a periphery of the fluid-filled bag to expose the pillars formed therein; and securing the support assembly between an upper and an outsole to form an article of footwear.

In accordance with yet another aspect, an article of footwear formed by the steps of forming a fluid-filled bag in a first mold and including a plurality of first recesses on a first side thereof and having a bottom, a plurality of second recesses on a second side thereof and having a top with a plurality of apertures extending there through, with each aperture extending through the bottom of a first recess and a top of a second recess; inserting the fluid-filled bag into a second mold; pouring a cushioning material into the second mold to form a support assembly with cushioning material covering the bag and extending into the recesses and through the apertures of the fluid-filled bag to form pillars; removing the support assembly from the second mold; cutting away a portion of the cushioning material about a periphery of the support assembly; cutting away a portion of a periphery of the fluid-filled bag to expose the pillars formed therein; and securing the support assembly between an upper and an outsole to form an article of footwear.

Substantial advantage is achieved by providing an article of footwear with support pillars. In particular, certain embodiments of the article of footwear with support pillars can provide increased support, comfort and performance.

These and additional features and advantages disclosed here will be further understood from the following detailed disclosure of certain embodiments.

BRIEF DESCRIPTION OF THE DRAWINGS

FIG. 6 is a perspective view of the support assembly formed in the mold of FIG. 5, shown being trimmed to its final form.

FIG. 7 is a perspective view of the support assembly formed in the mold of FIG. 5, shown in its final form.

FIG. 8 is a section view of a portion of a pillar of the support assembly of FIG. 7.

FIG. 9 is a section view of a portion of a pillar of another embodiment of the support assembly of FIG. 7.

Figure 1:
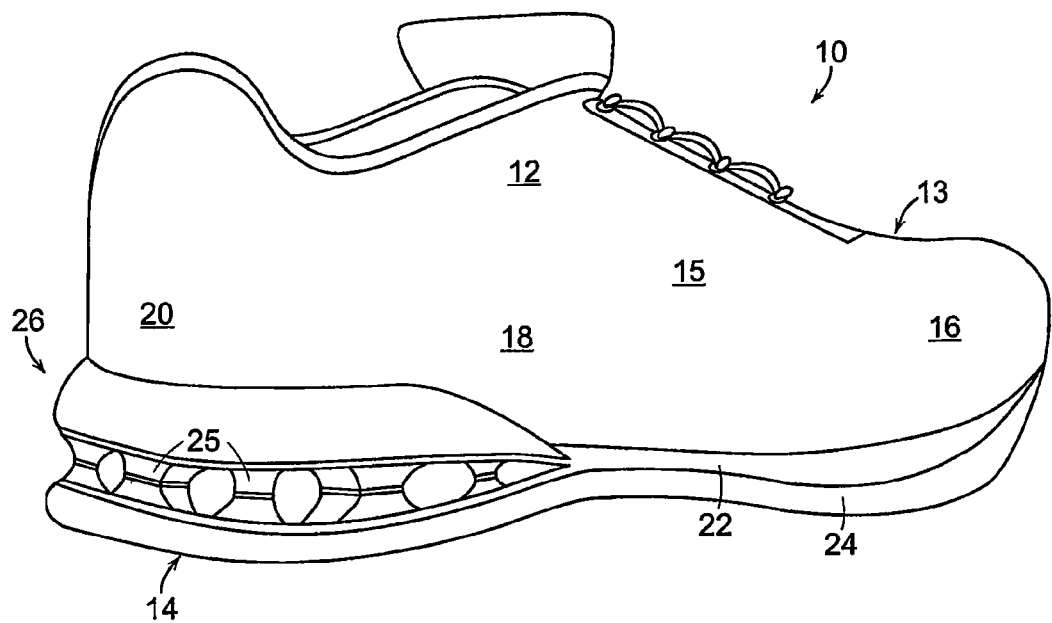
FIG. 1 is a perspective view of an embodiment of an article of footwear.

The figures referred to above are not drawn necessarily to scale and should be understood to provide a representation of the invention, illustrative of the principles involved. Some features of the article of footwear depicted in the drawings have been enlarged or distorted relative to others to facilitate explanation and understanding. The same reference numbers are used in the drawings for similar or identical components and features shown in various alternative embodiments. Articles of footwear as disclosed herein would have configurations and components determined, in part, by the intended application and environment in which they are used.

DETAILED DESCRIPTION OF CERTAIN PREFERRED EMBODIMENTS

The present invention may be embodied in various forms. A preferred embodiment of an article of footwear 10 is shown in FIG. 1. Footwear 10 includes an upper 12 and a sole assembly 14 secured to upper 12. Sole assembly 14 may be secured to upper 12 by adhesive or any other suitable means. Footwear 10 has a medial, or inner, side 13 and a lateral, or outer, side 15. For purposes of general reference, footwear 10 may be divided into three general portions: a forefoot portion 16, a midfoot portion 18, and a heel portion 20. Portions 16, 18, and 20 are not intended to demarcate precise areas of footwear 10. Rather, portions 16, 18, and 20 are intended to represent general areas of footwear 10 that provide a frame of reference during the following discussion.

Unless otherwise stated, or otherwise clear from the context below, directional terms used herein, such as rearwardly, forwardly, top, bottom, inwardly, downwardly, upwardly, etc., refer to directions relative to footwear 10 itself. Footwear 10 is shown in FIG. 1 to be disposed substantially horizontally, as it would be positioned on a horizontal surface when worn by a wearer. However, it is to be appreciated that footwear 10 need not be limited to such an orientation. Thus, in the illustrated embodiment of FIG. 1, rearwardly is toward heel portion 20, that is, to the left as seen in FIG. 1. Naturally, forwardly is toward forefoot portion 16, that is, to the right as seen in FIG. 1, and downwardly is toward the bottom of the page as seen in FIG. 1. Top refers to elements toward the top of the page as seen in FIG. 1, while bottom refers to elements toward the bottom of the page as seen in FIG. 1. Inwardly is toward the center of footwear 10, and outwardly is toward the outer peripheral edge of footwear 10.

Sole assembly 14, which is generally disposed between the foot of the wearer and the ground, provides attenuation of ground reaction forces (i.e., imparting cushioning), traction, and may control foot motions, such as pronation. As with conventional articles of footwear, sole assembly 14 may include an insole (not shown) located within upper 12, a midsole 22, and an outsole 24. Midsole 22 is attached to upper 12 and functions as the primary shock-attenuating and energy-absorbing component of footwear 10. Midsole 22 may be secured to upper 12 by adhesive or other suitable means. Suitable materials for midsole 22 include polymer foam materials such as ethylvinylacetate or polyurethane, or any other material that compresses resiliently. Outsole 24 is attached to the lower surface of midsole 22 by adhesive or other suitable means. Suitable materials for outsole 24 include polymers, e.g., polyether-block co-polyamide polymers (sold as Pebax® by ATOFINA Chemicals of Philadelphia, Pa.), and nylon resins such as Zytel®, sold by Dupont. Other suitable materials for outsole 24 will become readily apparent to those skilled in the art, given the benefit of this disclosure. In certain embodiments, sole assembly 14 may not include an outsole layer separate from midsole 22 but, rather, the outsole may comprise a bottom surface of midsole 22 that provides the external traction surface of sole assembly 14.

Sole assembly 14 includes a support assembly 26, which includes a plurality of pillars 25, described in greater detail below. As shown in the embodiments illustrated herein, support assembly 26 is positioned in heel portion 20 of footwear 10. It is to be appreciated that support assembly 26 can be positioned in one or more of heel portion 20, midfoot portion 18 and/or forefoot portion 16. As illustrated here, support assembly 26 is configured to span across footwear 10. However, it is to be appreciated that support assembly 26 could be configured to be positioned only on lateral side 15 or only on medial side 13 of footwear 10. In other embodiments, support assembly 26 could have one portion extending across footwear 10 with another portion positioned in only lateral side 15 or medial side 13. Other configurations of support assembly 26 will become readily apparent to those skilled in the art, given the benefit of this disclosure.

Figure 2:
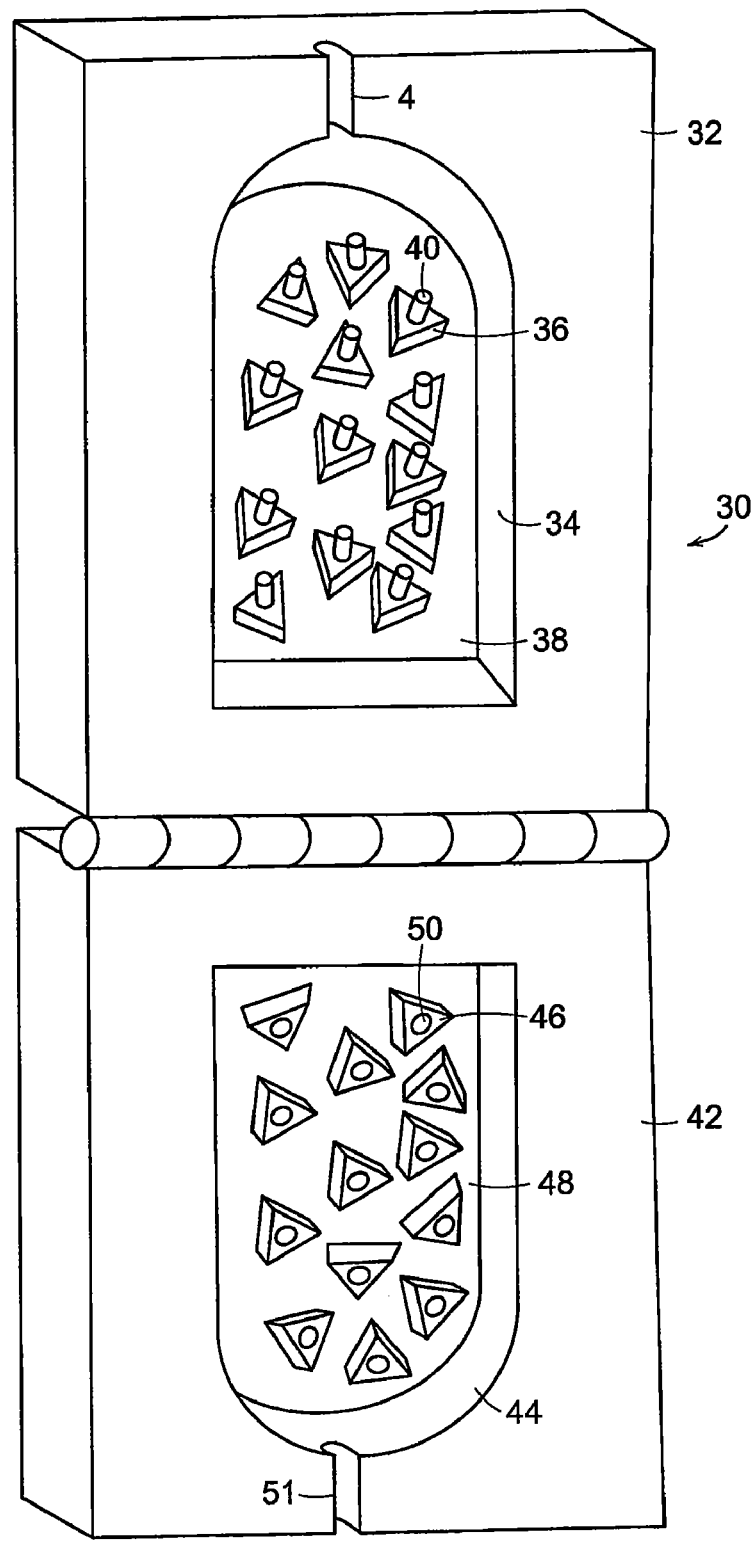
FIG. 2 is a perspective view of a mold used to form a fluid-filled bag used in the formation of a support assembly of the article of footwear of FIG. 1.
Figure 3C:
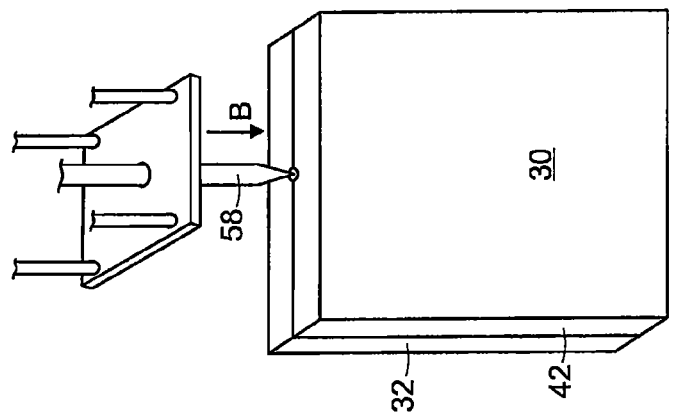
FIGS. 3A-C are elevation views of the use of the mold of FIG. 2 to form the fluid-filled bag used in the formation of the support assembly of the article of footwear of FIG. 1.
Figure 3B:
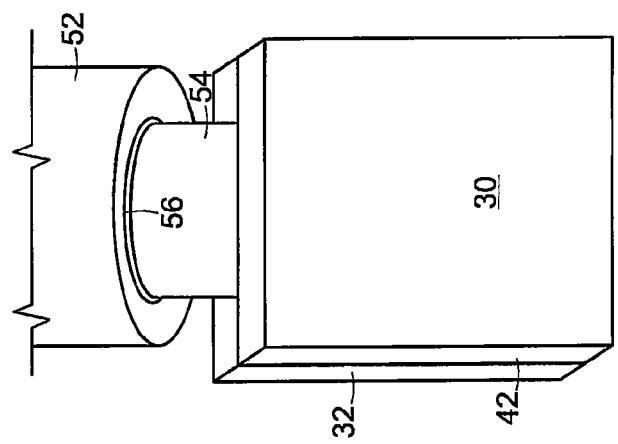
Figure 3A:
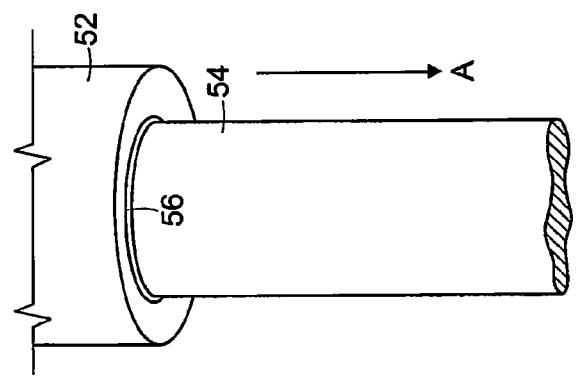
Figure 4:
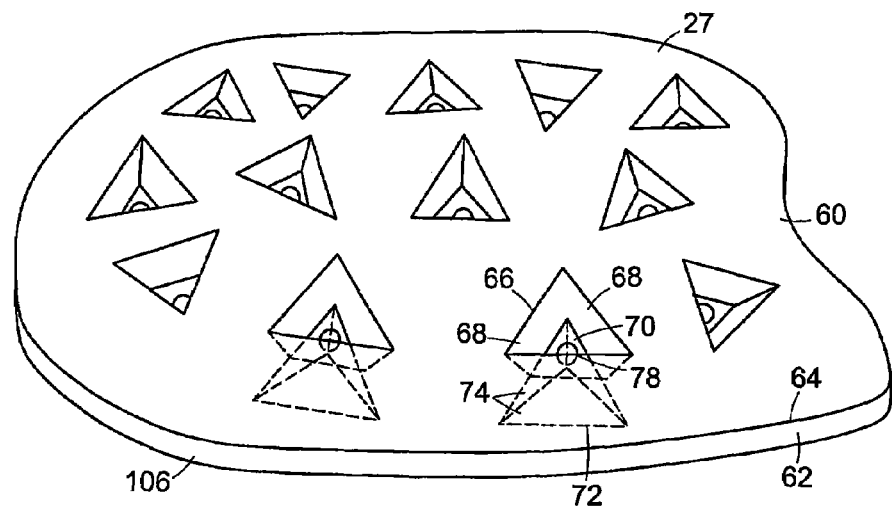
FIG. 4 is a perspective view of the fluid-filled bag formed in the mold of FIG. 2.

The formation of a fluid-filled bag 27 (seen in FIG. 4) for use in forming support assembly 26 is shown in FIGS. 2-4. A first mold 30, used to form fluid-filled bag 27 is seen in FIG. 2. First mold 30 includes a first portion 32 having a first recess 34 formed therein. A plurality of first projections 36 extend outwardly from the bottom 38 of first recess 34. A post 40 extends outwardly from each first projection 36. A first channel 41 extends between first recess 34 and an exterior of first portion 32.

A second portion 42 of first mold 30 is joined to first portion 32 by a hinge 43 and includes a second recess 44 formed therein. A plurality of second projections 46 extend outwardly from a bottom 48 of second recess 44. Each second projection 46 includes an aperture 50 that receives a corresponding post 40 of first portion 32 when first mold 30 is closed. A second channel 51 extends between second recess 44 and an exterior of second portion 42. Second channel 51 mates with first channel 41 of first portion 32 when first mold 30 is closed, providing an input port, as described in greater detail below. First projections 36 and second projections 46 combine to define first and second recesses 66, 72, respectively, of fluid-filled bag 27, as described in greater detail below.

First mold 30 is used to form fluid-filled bag 27 as seen in FIGS. 3A-C. An injector 52 outputs a substantially tubular sheet of material 54 downwardly in the direction of Arrow A from an aperture 56 formed therein. First mold 30 is then closed about sheet of material 54. A needle 58 is then inserted into an input port 53 (formed by the mating of first channel 41 and second channel 51 of first mold 30) in the direction of Arrow B and injects a fluid, such as air, into first mold 30, forcing material 54 against the inner surfaces of first mold 30 to form fluid-filled bag 27 (seen in FIG. 4). In certain embodiments, a vacuum may be applied to the exterior of sheet of material 54 within first mold 30.

Material 54 used to form fluid-filled bag 27 may be thermoplastic polyurethane (TPU), polyurethane, polyester, polyester polyurethane, polyether polyurethane, ethyl vinyl alcohol copolymers (EVOH) or scrap material. Other suitable materials for use in forming fluid-filled bag 27 will become readily apparent to those skilled in the art, given the benefit of this disclosure.

As seen in FIG. 4, fluid-filled bag 27 is formed of an upper portion 60 and a lower portion 62 joined by a parting line 64 created during the molding process by the junction of first portion 32 and second portion 42 of first mold 30. Upper portion 60 includes a plurality of first recesses 66 having one or more walls 68 and a bottom 70. Walls 68 of first recesses 66 may taper inwardly toward bottom 70. First recesses 66 are formed by first projections 36 of first portion 32 of first mold 30.

Lower portion 62 similarly has a plurality of second recesses 72 having one or more walls 74 and a top 76, which is in abutting relationship with bottom 70 of a corresponding first recess 66. Walls 74 of second recesses 72 may taper inwardly toward top 76. Second recesses 72 are formed by second projections 46 of second portion 42 of first mold 30. During the molding process described above with respect to FIGS. 3A-C, a bottom 70 of a first recess 66 and a top 76 of a corresponding second recess 72 are sealed with one another as first projections 36 and second projections 46 sandwich sheet of material 54 therebetween. An aperture 78 may extend through bottom 70 of a first recess 66 and the corresponding top 76 of a second recess 72. Apertures 78 are formed by projections 40 of first portion 32 of first mold 30.

In the embodiment illustrated, each first and second recess 66, 72 has a substantially triangular shape and, therefore, includes three walls 68, 74, respectively. Consequently, first and second projections 36, 46 have substantially triangular shapes as well. It is to be appreciated that other shapes for first and second recesses 66, 72 are considered to be within the scope of the present invention, and that the number and configuration of the walls for first and second recesses 66, 72 will vary accordingly. Thus, for example, first and second recesses 66, 72 may have square or rectangular shapes, which would require four walls 68, 74, respectively. In such an embodiment, first and second projections 36, 46 of first mold 30 will naturally have corresponding square or rectangular shapes. Other shapes and configurations for first and second recesses 66, 72 and, naturally, first and second projections 36, 46 will become readily apparent to those skilled in the art, given the benefit of this disclosure.

In other embodiments, fluid-filled bag 27 may be produced by the well known thermoforming process, in which a pair of polymer layers are heated and placed between a pair of mold portions. A vacuum on the exterior of the layers and/or pressure between the layers draws the layers into contours of the mold. The peripheries of the layers are then pressed together to form a peripheral bond, and various interior locations may also be pressed together to form interior bonds, thereby forming fluid-filled bag 27.

In other embodiments, fluid-filled bag 27 may be manufactured by a two-film technique, often referred to as twin-sheet bonding, wherein two separate layers of elastomeric film are formed to have the overall shape of the bag. The layers are then welded together along their respective peripheries to form an upper surface, a lower surface, and sidewalls of the bag, and the layers are welded together at predetermined interior locations to impart a desired configuration to the bag. That is, interior portions of the layers are connected to form chambers of a predetermined shape and size at desired locations. The bag is then subsequently pressurized above ambient pressure by inserting a nozzle or needle, which is connected to a fluid pressure source, into a fill inlet formed in the bag. After the bag is pressurized, the nozzle is removed and the fill inlet is sealed, by welding for example.

In other embodiments, fluid-filled bag 27 may be produced by the well known blowmolding process, in which a liquefied elastomeric material is placed in a mold having the desired overall shape and configuration of fluid-filled bag 27. Pressurized air is provided through an opening formed in the mold. The pressurized air forces the liquefied elastomeric material against the inner surfaces of the mold and causes the material to harden in the mold, thereby forming the fluid-filled bag 27 having the desired configuration.

In certain embodiments, fluid-filled bag 27 may be colored to provide a desired aesthetic appearance. Fluid-filled bag 27 may be painted after it has been formed in first mold 30, e.g., spray painted. The desired color may be added by screen printing, sublimation or any other desired method. In other embodiments, pigment may be added to material 54, which is used to form fluid-filled bag 27, in order to provide a desired color. Other methods of imparting color to fluid-filled bag 27 will become readily apparent to those skilled in the art, given the benefit of this disclosure. It is to be appreciated that fluid-filled bag 27 may be painted a single color, or any combination of desired colors, and in any desired pattern to produce a desired aesthetic appearance.

Figure 5:
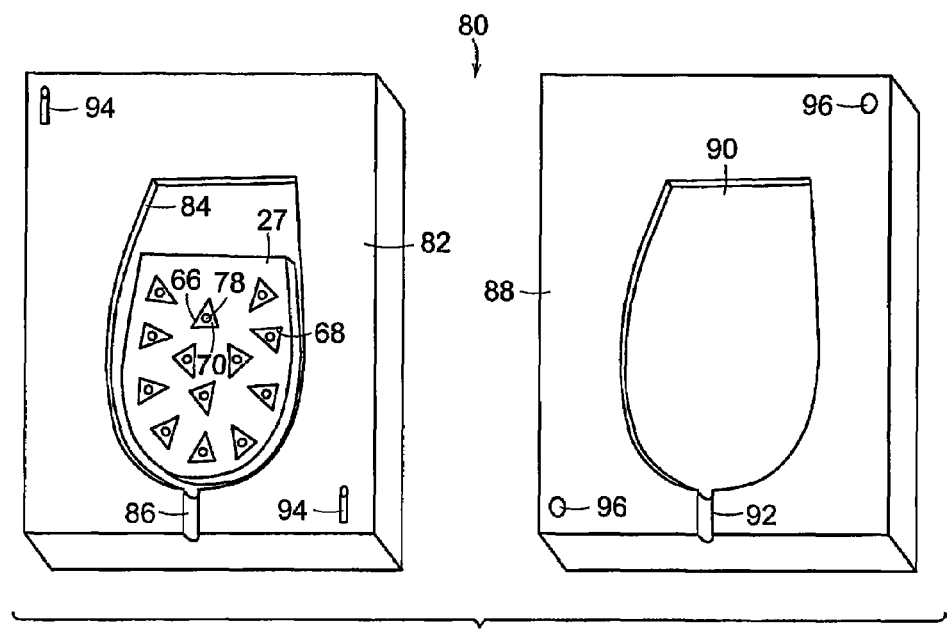
FIG. 5 is a perspective view of a mold used to form the support assembly of the article of footwear of FIG. 1.

A second mold 80, seen in FIG. 5, is used with fluid-filled bag 27 to form support assembly 26. Second mold 80 has a first portion 82 having a recess 84 formed therein. A first channel 86 extends from a periphery of first portion 82 to recess 84. A second portion 88 has a projection 90 formed thereon, with a second channel 92 extending from a periphery of second portion 88 to projection 90. First portion 82 has a plurality of pins 94 that are received in corresponding apertures 96 formed in second portion 88 in order to register and align first portion 82 with second portion 88.

Fluid-filled bag 27 is placed in recess 84 of first portion 82. A cushioning material 98, seen in FIGS. 6-8, is then poured into recess 84, covering fluid-filled bag 27. Cushioning material 98 covers the exterior of fluid-filled bag 27, as well as filling first and second recesses 66, 72 and extending through apertures 78, thereby forming pillars 25, seen in FIGS. 6-8. Second portion 88 is then placed on first portion 82 such that first and second channels 86, 92 are aligned with one another to define a channel that receives needle 58 used to form fluid-filled bag 27, a portion of projection 90 is received in recess 84, and cushioning material 98 expands and fills first and second recesses 66, 72 and recess 84. Pillars 25 may have visible a parting line 102, formed at the junction of walls 68 and 74 of first recess 66 and second recess 72, respectively, during the molding process.

A strip 104 of cushioning material 98 about the periphery of support assembly 26 and the periphery 106 of fluid-filled bag 27 is then cut away, exposing support assembly 26, as seen in FIGS. 6-7. Pillars 25 of support assembly 26 can be seen to extend between the cushioning material 98 that extends over the upper portion 60 of fluid-filled bag 27 and the cushioning material 98 that extends beneath the lower portion 62 of fluid-filled bag 27. Pillars 25, as seen in FIG. 8, are formed of an outer layer 108, which comprises walls 68, 74 of first and second recesses 66, 72, respectively of fluid-filled bag 27, and an inner layer 110 of cushioning material 98. Cushioning material 98 and, naturally, pillars 25, serve to act as a portion of midsole 22 of footwear 10.

In certain embodiments, cushioning material 98 is poured polyurethane. It is to be appreciated that other materials that will enhance the cushioning effect of support assembly 26 can be used for cushioning material 98, such as ethyl vinyl acetate (EVA). Other suitable materials for cushioning material 98 will become readily apparent to those skilled in the art, given the benefit of this disclosure. In certain embodiments, cushioning material 98 could be pre-formed and merely inserted into first and second recesses 66, 72 and around fluid-filled bag 27.

As seen in FIG. 8, pillars 25 may taper inwardly from their top toward a midpoint thereof, at parting line 102, and inwardly from a bottom thereof to the midpoint at parting line 102.

It is to be appreciated that cushioning material 98 may also be colored, and that different portions of cushioning material 98 may have different colors, thereby allowing one or more pillars 25 to have a first color with one or more other pillars 25 having a second different color. It is to be appreciated that any number of different colors can be used on pillars 25. Certain portions of pillars 25 may have one color with other portions having different colors. Thus, outer layer 108 and inner layer 110 of pillars 25 can have any desired color combination to provide a desired aesthetic design.

In addition, cushioning material 98 may not be uniform throughout support assembly 26, that is, a first cushioning material 98 having a first set of characteristics (density, compressibility, stiffness, etc.) could be initially poured into a first portion of second mold 80 and a second cushioning material 98 that is different than the first (that is, it has a set of characteristics different than that of the first cushioning material) could be poured into a second portion of second mold 80. It is to be appreciated that any number of different cushioning materials can be provided throughout support assembly 26.

In another embodiment, as seen in FIG. 9, inserts 112 may be positioned within fluid-filled bag 27. As seen in this embodiment, inserts 112 are positioned in first and second recesses 66, 72 and include a central aperture 114 extending there through. Cushioning material 98 passes through apertures 114 and fills the interior of inserts 112, such that inserts 112 are positioned within cushioning material 98 or inner layer 110. Inserts 112 act to provide additional support for pillars 25. In certain embodiments, inserts 112 may be formed of a material having a greater stiffness or rigidity than that of cushioning material 98. For example, inserts 112 may be formed of plastic.

It is to be appreciated that in certain embodiments, outer layer 108 could be formed by injection molding material into a desired shape. In such an embodiment, the injection molded material is then placed into second mold 80 and cushioning material 98 is poured into the mold, forming pillars 25.

Figure 10:
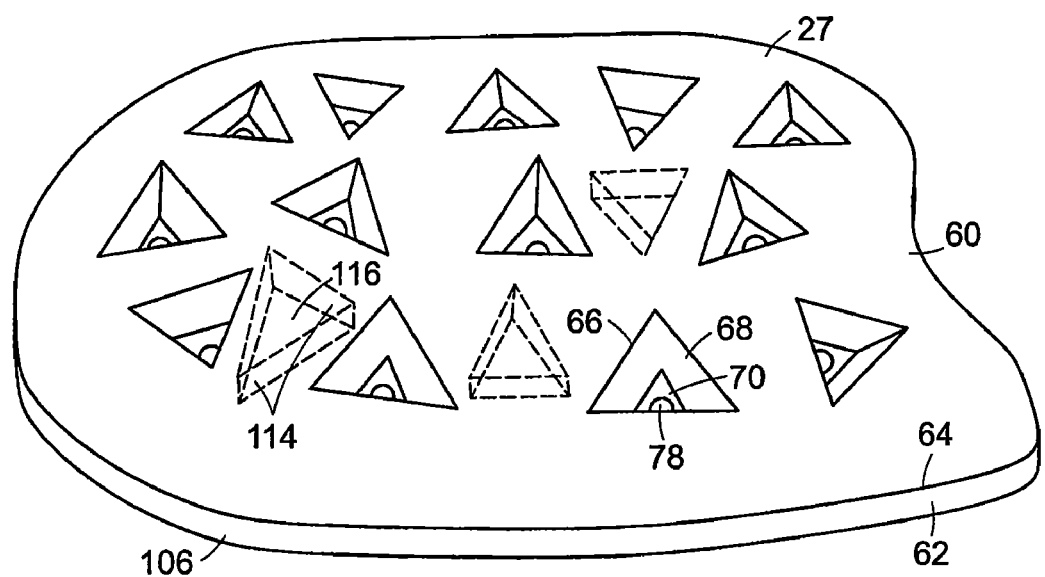
FIG. 10 is a perspective view of another embodiment of the fluid-filled bag formed in the mold of FIG. 2.

It is to be appreciated that in certain embodiments, as depicted in FIG. 10, fluid-filled bag 27 may have first recesses 66 formed on only one side thereof, with the other side of fluid-filled bag 27 being substantially flat. Thus, cushioning material 98 extends into each first recess 66 such that the walls 68 of first recess 66 and cushioning material 98 form outer layer 108 and inner layer 110, respectively, of pillars 25.

It is to be appreciated that in certain embodiments, as seen in FIG. 10, fluid-filled bag 27 may include interior walls or partitions 114 defining chambers 116. In such embodiments, only a portion of periphery 106 of fluid-filled bag 27 may be cut away in the manner described above, thereby leaving intact some chambers 116 of fluid-filled bag 27. Chambers 116 may be at ambient pressure or inflated to a higher pressure. Chambers 116 can provide additional support for support assembly 26.

By providing particular shapes, and sizes and locations of first and second recesses 66, 72, the support provided by pillars 25 can be optimized. That is, the performance characteristics of footwear 10 can be altered by positioning pillars 25 in desired locations and by forming pillars 25 with desired shapes. Accordingly, footwear 10 can be optimized for particular activities, particular foot shapes or for any other reason. Similarly, the amount and type of cushioning material 98 can be varied throughout footwear 10 to optimize performance.

Similarly, by varying the thickness of the walls of fluid-filled bag 27, the thickness of outer layers 108 can be varied, thereby modifying the performance of pillars 25.

In light of the foregoing disclosure of the invention and description of various embodiments, those skilled in this area of technology will readily understand that various modifications and adaptations can be made without departing from the scope and spirit of the invention. All such modifications and adaptations are intended to be covered by the following claims.

What is claimed is:

1. An article of footwear comprising, in combination:
   an upper;
   a sole assembly; and
   a support assembly positioned in the sole assembly and including a plurality of pillars, each pillar comprising an outer layer and an inner layer of cushioning material contained within the outer layer such that the entire outer layer completely circumferentially surrounds the inner layer without any voids between the inner layer and the outer layer.

2. The article of footwear of claim 1, wherein the support assembly is positioned in a heel portion of the sole assembly.

3. The article of footwear of claim 1, wherein at least one of the pillars has a triangular cross-section.

4. The article of footwear of claim 1, wherein the outer layer of the pillars is formed of an upper portion and a lower portion, the upper portion comprising a first recess formed of walls and a bottom, the lower portion comprised of a second recess formed of walls and a top, the bottom of the first recess and the top of the second recess being in abutting relationship, an aperture extending through the bottom of the first recess and the top of the second recess, the inner cushioning material extending through the aperture.

5. The article of footwear of claim 4, wherein the walls of the first recess taper inwardly to the bottom of the first recess, and the walls of the second recess taper inwardly to the top of the second recess.

6. The article of footwear of claim 1, wherein the outer layer is formed of TPU.

7. The article of footwear of claim 1, wherein the inner cushioning material is formed of polyurethane.

8. The article of footwear of claim 1, wherein the sole assembly includes a midsole, the midsole comprising the inner cushioning material contained within the pillars.

9. The article of footwear of claim 1, wherein the pillars taper inwardly from a top thereof to a midpoint thereof and from a bottom thereof to the midpoint.

10. The article of footwear of claim 1, wherein at least a portion of the support assembly has a desired color.

11. The article of footwear of claim 1, wherein a first portion of the support assembly has a first color and a second portion of the support assembly has a second color.

12. The article of footwear of claim 11, wherein the first portion is the outer layer of a first pillar and the second portion is the outer layer of a second pillar.

13. The article of footwear of claim 1, wherein a portion of the cushioning material has a first color and a second portion of the cushioning material has a second color.

14. The article of footwear of claim 1, wherein the outer layer of the pillars is formed of an upper portion and a lower portion, the upper portion comprising a recess formed of walls and a bottom, the inner cushioning material extending into the recess.

15. The article of footwear of claim 1, further comprising at least one insert positioned within the inner layer of a corresponding pillar.

16. The article of footwear of claim 15, wherein the insert is formed of plastic.

17. The article of footwear of claim 1, wherein a first portion of the support assembly has a first cushioning material and a second portion of the support assembly has a second cushioning material that is different than the first cushioning material.

18. The article of footwear of claim 1, further comprising at least one interior chamber positioned within the support assembly.

19. An article of footwear comprising, in combination:

an upper;

a sole assembly; and a support assembly positioned in a heel portion of the sole assembly and including a plurality of pillars, each pillar comprising an outer layer comprising:

an upper portion comprising a first recess formed of walls and a bottom; and a lower portion comprising a second recess formed of walls and a top, the bottom of the first recess and the top of the second recess being in abutting relationship; and an aperture extending through the bottom of the first recess and the top of the second recess; and an inner layer of cushioning material contained within the outer layer and extending through the aperture such that the outer layer completely circumferentially surrounds the inner layer without any voids between the inner layer and the outer layer.

20. The article of footwear of claim 19, wherein the support assembly is positioned in a heel portion of the sole assembly.

21. The article of footwear of claim 19, wherein at least one of the pillars has a triangular cross-section.

22. The article of footwear of claim 19, wherein the walls of the first recess taper inwardly to the bottom of the first recess, and the walls of the second recess taper inwardly to the top of the second recess.

23. The article of footwear of claim 19, wherein the outer layer is formed of TPU.

24. The article of footwear of claim 19, wherein the inner cushioning material is formed of polyurethane.

25. The article of footwear of claim 19, wherein the sole assembly includes a midsole, the midsole comprising the inner cushioning material contained within the pillars.

* * * * *